(12) United States Patent

Ylitalo

(10) Patent No.: US 7,189,126 B2
(45) Date of Patent: Mar. 13, 2007

(54) SHIP'S PROPULSION ARRANGEMENT AND METHOD

(75) Inventor: Jari Ylitalo, Lohja (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/479,979

(22) PCT Filed: Jun. 14, 2001

(86) PCT No.: PCT/FI01/00565

§ 371 (c)(1),
(2), (4) Date: May 18, 2004

(87) PCT Pub. No.: WO02/102659

PCT Pub. Date: Dec. 27, 2002

(65) Prior Publication Data

US 2004/0214484 A1    Oct. 28, 2004

(51) Int. Cl.
B63H 5/125   (2006.01)
B63H 21/17   (2006.01)
H02K 5/132   (2006.01)
H02K 9/08    (2006.01)
H02K 9/12    (2006.01)

(52) U.S. Cl. .............................. 440/6; 310/52; 310/64

(58) Field of Classification Search .................... 440/6, 440/88 C, 88 HE; 310/52–55, 64, 87
See application file for complete search history.

(56) References Cited

U.S. PATENT DOCUMENTS 2,714,866 A    8/1955 Pleuger et al.
5,403,216 A *  4/1995 Salmi et al. .................... 440/6
5,643,026 A    7/1997 Pietsch et al.
6,231,407 B1 * 5/2001 Hein et al. ...................... 440/6
6,485,339 B1 * 11/2002 Hartig et al. .................... 440/6
6,676,463 B2 * 1/2004 Le Bert et al. ................. 440/6
2004/0053545 A1* 3/2004 Le Flem et al. .......... 440/88 C

FOREIGN PATENT DOCUMENTS

| DE | 26-26-048 | | 1/1977 |
| EP | 0590867 A1 | | 4/1994 |
| EP | 1010614 A1 | * | 6/2000 |
| EP | 1213221 A1 | * | 6/2002 |
| JP | 11278379 A | * | 10/1999 |
| JP | 2004017902 A | * | 1/2004 |
| WO | WO 0154973 A1 | | 8/2001 |

* cited by examiner

*Primary Examiner*—Ajay Vasudeva
(74) *Attorney, Agent, or Firm*—Arent Fox LLP

(57) ABSTRACT

The invention relates to a ship's propulsion and steering arrangement surrounded by water comprising an electric motor in a chamber, a propeller shaft associated with the electric motor having a propeller fitted outside the chamber, and a pressure source for pressurizing the chamber with air or some other pressurizing medium. The invention also relates to a method for managing fluid flows in the propulsion and steering arrangement of the aforementioned kind, wherein the chamber is sealed against the water pressure from outside and against other compartments of the ship. The chamber is pressurized by means of a flowing medium, monitoring of the pressure in the chamber is performed, and the composition of the medium escaping from the chamber in a controlled manner is monitored. Further, the invention comprises a method for improving the cooling by means of a pressurized gaseous medium.

35 Claims, 1 Drawing Sheet

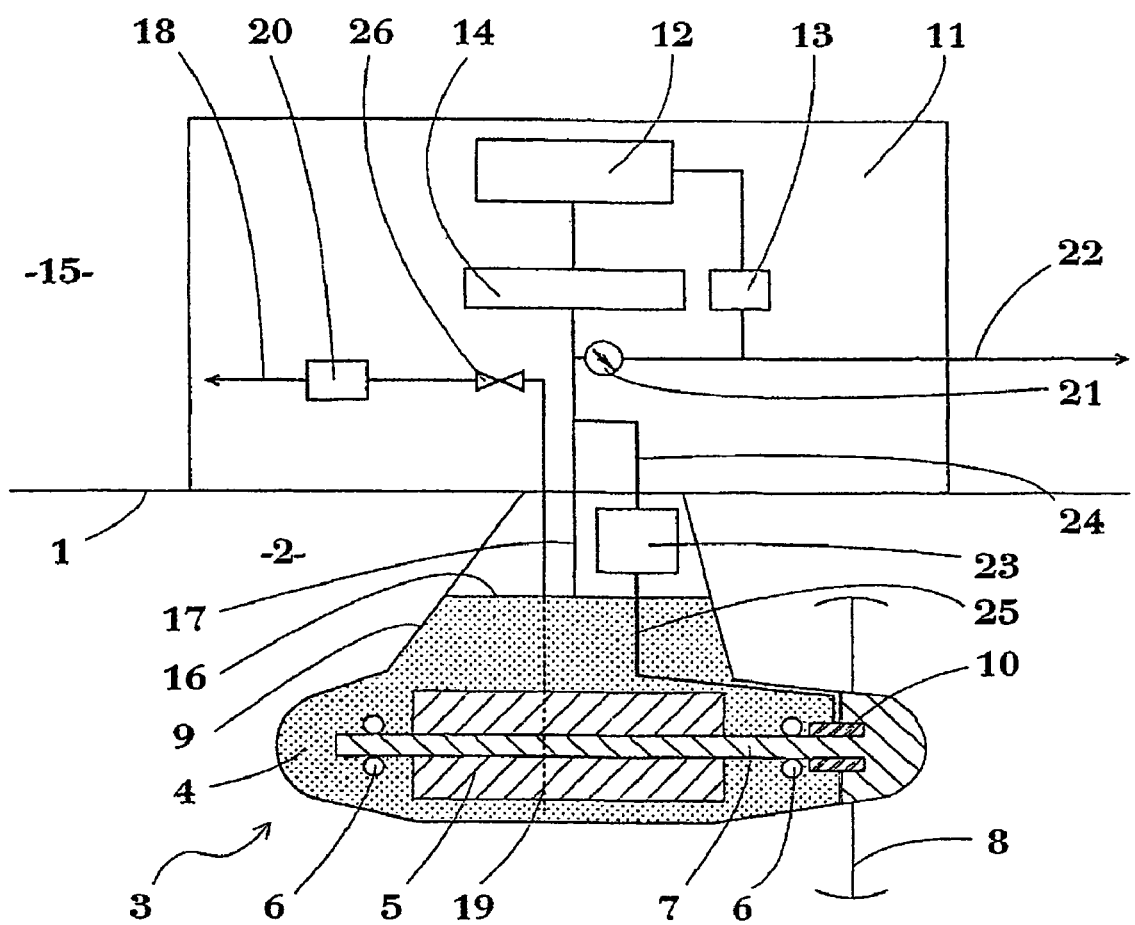

SHIP'S PROPULSION ARRANGEMENT AND METHOD

CROSS-REFERENCE TO RELATED APPLICATION

This application is a National Stage entry of International Application No. PCT/FI01/00565, the entire specification claims and drawings of which are incorporated herewith by reference.

BACKGROUND OF THE INVENTION

1. Field of the Invention

The present invention relates to such a ship's propulsion and/or steering unit arrangement, at least partly surrounded by water, that comprises an electric motor in a substantially sealed chamber formed by the unit walls, a propeller shaft associated with said electric motor having a propeller or a similar device fitted outside said chamber for transmitting the electric motor's power as motion energy into the surrounding water. The present invention further relates to a method for managing fluid flows in the propulsion and/or steering unit presented above. The present invention also relates to an arrangement for improving the efficiency of the cooling of a propulsion device's motor in a propulsion and/or steering unit as discussed above.

2. Discussion of Related Art

Previously known are propulsion units for ships or similar devices operating on a water surface, said devices comprising outside the actual hull a substantially sealed chamber within which an in most cases electrical motor is arranged. The motor shaft functions either directly or by means of a suitable gearing as a propeller shaft, which outside the chamber has a propeller fitted for transforming the motor power into a flow of water driving the ship. In most modern arrangements, this kind of chamber is, in addition, fitted rotatably about the vertical axis, in which case the device at the same time functions both as a ship's propulsion and steering means. The applicant provides devices of this kind with the trade mark Azipod™.

Such so-called pods are disposed underneath the water surface, at least as concerns their substantial part, and usually there is arranged a connection to the inside of the hull through a vertical shaft tube or similar. At least when the ship is in water, the entrance e.g. for maintenance takes place via this connection, which often is rather cumbersome. Since, however, an underwater shaft arrangement is associated with the arrangement, in which arrangement one part of the shaft is inside the chamber and the other part outside, there always is a certain possibility of leakage, in which case this kind of leakage must be detected and any possible raising of the water level in the chamber must be stopped. Since the chamber often is disposed in a substantially cold water, there is at the same time a risk that e.g. humidity in the cooling air is condensed at the chamber walls, which also results in water accumulating on the bottom of the chamber. Due to these reasons, the arrangement has this far required specific control and pumping arrangements to be arranged in the chamber.

In the same way, also during operation there is a need to perform in the chamber different maintenance measures associated with the functioning of the motor and the rest of the equipment, the purpose of which is on the one hand an ensuring of sealing and on the other hand a continuous maintaining of different lubrication and similar functions.

Further, motor arrangements having a structure of the aforementioned type have been developed, in which the heat generated by the electric motor is, at least for its substantial parts, conducted directly into the surrounding water. In such a structure, the motor body functions as an intermediate means for transmission of heat, in which case the surface of the pod, in turn, functions as a cooler. In that case, one of the problems has involved poor transmission of heat from the stator into the motor body and from it further into the pod housing.

SUMMARY OF THE INVENTION

In order to overcome the aforementioned disadvantages and to achieve a simple, dependable and easy-to-use management arrangement of the operating conditions of a propulsion device, an arrangement according to the present invention has been developed, the characteristic features of which being disclosed in the accompanying claims and particularly in the characterizing portion of the independent claims. Thus, the propulsion and/or steering unit arrangement according to the present invention is characterized by the fact that it includes means for pressurizing said substantially sealed chamber with air or the like especially gaseous medium, the thermal conductivity of which increases at with a pressurization thereof. Correspondingly, the method according to the present invention for managing flows of fluids is characterized by the fact that said substantially sealed chamber is sealed on the one hand against water pressure from outside and on the other hand against other compartments of the ship, that the chamber is pressurized with a gaseous medium, that one performs monitoring of the pressure in the chamber and that one monitors the composition of any medium escaping from the chamber in a controlled manner due to pressure. The cooling method according to the present invention is characterized by the fact that the cooling of the motor is improved by increasing the pressure of the gaseous medium in the motor compartment in such a manner that the thermal conductivity of a gaseous medium increases, which causes heat to be more efficiently transmitted into the motor body, specially from the area of the stator winding overhangs, and from it through the chamber walls directly into the surrounding water.

BRIEF DESCRIPTION OF THE DRAWINGS.

In the following, the present invention will be described in more detail with reference, by way of example, to one embodiment and a schematic drawing representing it.

DETAILED DESCRIPTION OF THE INVENTION.

As shown in the FIGURE, a propulsion unit 3 substantially surrounded by water is arranged outside a ship's hull 1, said propulsion unit comprising a chamber 4 which is substantially sealed at least against a surrounding mass of water 2, said chamber having an electric motor or similar power unit intended for driving the ship, which is not described in more detail herein. Fitted on a shaft 7 rotated in bearings 6 by said electric motor 5, fairly schematically presented In the FIGURE, are one or more propeller means 8, which as known per se, and which are also shown only schematically. The propeller means 8 transforms, in a manner known per se, the rotational energy transmitted by the motor 5 to the shaft into a flow of water driving the ship.

The propulsion unit 3 is advantageously fitted on the hull 1 so that it can be turned by means of a vertical shaft formed in conjunction with the upper body 9, in which case the propeller flow can at the same time, by turning the propulsion unit, be directed sideways, due to which a change of direction of the propulsive force can be utilized for maneuvering the ship. This structure known per se is, however, not substantial with regard to the present invention, and the arrangement according to the present invention can also be applied e.g. to non-turning propulsion arrangements. These have, however, in common the fact that the propulsion arrangement forms a separate chamber 4, of which a substantial part is usually located in water 2 below the water surface.

In order that the devices 5, 6, 7 in the chamber 4 would remain dry, there is a shaft gasket 10 fitted in connection with to said shaft 7 for preventing water From passing from the surrounding mass of water 2 along the shaft 7 into the chamber 4. With such shaft gaskets 10 it is in practice difficult to achieve a perfect sealing, since in such a sealing solid walls or similar structures of the chamber 4 connect to a rotating shaft 7 that are associated with one another. Therefore, at least by wearing, there is a certain clearance to be found in the shaft gasket 10, which at the same time provides an access for the water outside the chamber into the chamber 4 in such a manner that water is gradually accumulated on the bottom of the chamber 4, and such water has to be removed by specific arrangements. Correspondingly, the lubrication of the bearings 6 is difficult to implement to be perfectly sealed in the long term, in which case lubricant is dripping from the bearings with time, and such lubricant must also be removed from the chamber.

By means of the arrangement according to the present invention both problems, in a way due to insufficient sealing, have been solved simply and dependably. In practice this means that an excess pressure is artificially provided in the chamber, said pressure in an optimal situation corresponding at least to the external pressure especially prevailing outside 2 the chamber 4, and in some advantageous cases also to the pressure prevailing in the pressure lubrication system of the bearings 6 (not specifically shown in the FIGURE). Advantageously, the last-mentioned pressure is separately adapted to correspond to the average water pressure prevailing outside the chamber 4 at the level of the shaft sealing 10. In this manner, by suitably pressurizing the chamber 4, any passing of water via the shaft gasket 10 to the chamber 4 can in practice be eliminated. The pressures being balanced, the arrangement at the same time prevents e.g. lubricating oil of the bearings from passing 6 into the surrounding water.

According to the present invention, the pressurizing of the chamber 4 significantly improves the heat conduction from the area of the stator winding overhang. A gaseous medium under pressure conducts heat considerably efficiently into the motor 5 body. When the motor 5 body in this structure preferably is in a direct contact with the walls of the chamber 4, the heat will be efficiently conducted, in this manner, to the surrounding water. In this manner heat exchanger arrangements used so far can be avoided while at the same time the relative efficiency of the motor 5 can be increased.

In practice, the pressurization of the chamber 4 can be effected in various ways, of which the FIGURE shows one advantageous embodiment. The arrangement disclosed in the FIGURE thus comprises pressure source means 12 suitably provided in a separate device compartment 11, which means may comprise a compressor, a pressure container or similar known means, which are governed by a control unit 13 in a controlled manner. Processing means 14 such as a water trap or similar, that may be used when necessary, for a flowing medium such as air or other gas pressurized by said pressure source 12 are preferably connected to the pressure source. While a gaseous substance is usually considered the most preferred flowing medium, the arrangement according to the invention can, in some special cases, also be applied by means of liquid mediums such as certain oils, cooling liquids or the like, or by a combined use of gas and liquid. Characteristic for the present invention is, however, that the whole sealed interior of the chamber 4 is pressurized by means of the medium in question, which thus fills at least a substantial part of the chamber. According to one embodiment, the pressurizing arrangement according to the present invention is also utilized as a part of a fire extinguishing system.

Advantageously, the pressure of a medium such as air or other gas in the chamber is higher than the atmospheric pressure in the ship's compartment 15 above the chamber, preferably at least substantially the same as the pressure of the surrounding water 2 at the propeller shaft 7 level. This pressure is usually clearly higher than any pressure used for maintaining the flow of air for cooling a possibly air-cooled electric motor. Typically, the pressure caused by pressurizing is higher than the hydrostatic pressure between the chamber's 4 bottom and the level of the ship's interior 15, favorably higher than the hydrostatic pressure of the water surrounding the chamber 4, and preferably higher than the dynamic pressure of the surrounding water as measured at the level of the chamber's bottom. Typically, this kind of pressure is of the order of 0.1 to 1 bar higher than the pressure which corresponds to the hydrostatic pressure near the shaft gasket 10. The excess pressure required by a hydrostatic pressure e.g. at a depth of four meters, in comparison to the atmospheric pressure, would thus be of the order of 0.5 to 1.4 bar, according to the present invention.

In practice, the chamber sealing for enabling the forming of an excess pressure is preferably provided by means of a separate pressure wall 16, which usually has the necessary manholes to permit access for maintenance (not shown). By means of said pressure wall 16 the compartment constituted by the chamber 4 can be closed in such a manner that the overpressure in accordance with the present invention can in a normal case be maintained by a fairly low energy consumption. For illustrative purposes the pressure wall 16 is shown in the FIGURE so that it is disposed in the middle of an upper body portion 9, in which case the pressurized portion of the chamber 4 is shown by means of half-tone print. Advantageously, the pressure wall 16 is in practice located at the boundary between the hull 1 and the upper body portion 9, as distinct from what is disclosed in the FIGURE, but the pressure wall can also be located farther down e.g. immediately above the motor 5, or alternatively farther up e.g. in connection with the wall of the device compartment 11. A feeder conduct 17 extending from the pressure source 12 is conducted through the pressure wall 16 into the chamber 4, as shown in the FIGURE.

The arrangement according to the invention present also enables a removal, from the chamber, of any humidity possibly accumulating in the chamber, e.g. on its bottom, by utilizing the excess pressure, e.g. by means of an extension 19 of an discharge pipe 18 conducted to the bottom, as marked in the FIGURE with a dashed line. In conjunction with this discharge pipe 18, also e.g. emergency pumping means (not shown) for the chamber 4 and means 20 for analyzing the escaping substance for detecting a leakage can be suitably arranged, as well as valve means 26 for closing the pipe for maintaining the pressure in the chamber 4. According to one embodiment (not specifically shown) of the present invention, the discharge pipe 18, 19 is arranged to be part of a circulation system for the pressurized medium, in which case humidity is continuously removed e.g. from a circulating pressurization gas by treatment means 14 while at the same time the sealing of the chamber 4 is monitored so that any water or oil possibly showing in the pressurized circulating medium is detected. In the same way it is usually important that the operation of the pressurizing as such is monitored, which is schematically shown in the FIGURE by a pressure gauge 21 and an alarm signal output 22.

More redundancy is achieved by a shaft gasket arrangement disclosed in the FIGURE, said arrangement comprising a redundant oil reservoir 23. This oil reservoir is preferably pressurized by means of the same pressurizing system which usually pressurizes the chamber 4, in which case oil is specifically fed 25 to the shaft gasket 10. In certain cases, this enables one to contribute, by means of pressurizing, and specifically using gas that is lighter than air, to the reduction of abrasion losses, specially in the shaft gasket 10. By pressurizing a gravitational oil reservoir 23 to the same pressure with the chamber 4, an overpressure is achieved for the shaft gasket 10 both in relation to the chamber 4 and to the mass of water 2. According to another embodiment of the invention, the arrangement is, in turn, such that the feeding of a pressurized medium is arranged, at least for some parts, in conjunction with separate objects to be lubricated, in which case it is possible to direct an oil mist via the system into the gasket 10 or some other object in the chamber 4.

In yet another (not shown) embodiment of the present invention, the arrangement is, in addition, such that the pressurizing is actively utilized, according to the principles presented above, for implementing other functions such as an oil change for the bearings 6. In that case, the bearing oil is removed up to the device compartment 11, e.g. via separate piping, by means of pressurizing. Correspondingly, the an filling can be performed either by using pressurized oil or e.g. by removing the pressurization from the chamber 4, in which case the oil can be filled gravitationally.

Above an arrangement has been discussed, in which solely one propeller means 8 is associated with said chamber 4, but it must be understood that the invention can be applied also in such arrangements in which the number of propellers is higher e.g. in such a manner that there is a propeller at both ends of the shaft 7. In a corresponding manner, the invention can be modified in various other ways within the scope of the appended claims.

The invention claimed is:

1. A ship's propulsion arrangement, at least partly surrounded by water, comprising an electric motor arranged in a sealed chamber formed by walls of the arrangement, a propeller shaft connected to the electric motor having a propeller fitted outside the sealed chamber wherein pressurizing means are provided in connection with the arrangement for pressurizing the sealed chamber with a pressurizing medium, wherein a pressure maintained in the sealed chamber by the pressurizing means is equal to the hydrostatic pressure of the water surrounding the sealed chamber at a level even with the propeller shaft, means for circulating the pressurizing medium via at least a part of the sealed chamber and back to the outside of the sealed chamber, and means for detecting any extraneous substances mixed with the pressurizing medium in a return circulation of the pressurizing medium.

2. The arrangement according to claim 1, wherein the pressure in the sealed chamber is higher than a pressure in a ship's compartment located above the sealed chamber.

3. The arrangement according to claim 1, wherein the pressurizing means includes a pressure source controlled by a pressure control unit for providing a pressure in the medium, means for conducting the medium into the sealed chamber, and means for closing the sealed chamber pressure-tightly against other compartments of the ship.

4. The arrangement according to claim 1, wherein the arrangement further comprises means for circulating the pressurizing medium via at least a portion of the sealed chamber and back to the outside of the sealed chamber.

5. The arrangement according to claim 1, wherein the arrangement further comprises means operating with the pressurizing means for feeding other substances in a controlled manner into the sealed chamber and correspondingly for removing the other substances from the sealed chamber.

6. The arrangement according to claim 5, wherein the other substances are liquid or gaseous substances.

7. The arrangement according to claim 5, wherein the other substances are at least one of a group consisting of oil, gas, water, and a cooling substance.

8. The arrangement according to claim 1, wherein the arrangement further comprises an operational seal provided between the sealed chamber and the surrounding water, wherein the pressurized medium is fed to the operational seal and wherein the pressurizing medium contributes to the sealing of the operational seal.

9. The arrangement according to claim 8, wherein the operational seal is a pressure seal of the propeller shaft.

10. The arrangement according to claim 8, wherein the pressurizing medium includes a substance and wherein the combination of the pressurizing medium and the substance contributes to the sealing of the operational seal.

11. The arrangement according to claim 1, the arrangement further comprising:
  means for appropriately separating the extraneous substances from the pressurizing medium.

12. The arrangement according to claim 1, the arrangement further comprising:
  means for giving an alarm when any extraneous substances are detected in the pressurizing medium.

13. The arrangement according to claim 1, wherein the pressurizing medium is air.

14. The arrangement according to claim 1, wherein the ship's propulsion arrangement is useable for steering.

15. The arrangement according to claim 1, the arrangement further comprising:
  means for appropriately separating the extraneous substances from the pressurizing medium; and
  means for giving an alarm when any extraneous substances are detected in the pressurizing medium.

16. A method for managing fluid flows in a ship's propulsion arrangement which is at least partly surrounded by water, wherein the arrangement includes an electric motor arranged in a sealed chamber formed by walls of the arrangement, a propeller shaft associated with the electric motor having a propeller fitted outside the sealed chamber, the method comprising the steps of:
  sealing the sealed chamber against the water pressure from outside and against other compartments of the ship,
  pressurizing the sealed chamber by means of a flowing gaseous medium,
  monitoring a pressure in the sealed chamber, and
  monitoring a composition of the flowing gaseous medium escaping in a controlled manner from the sealed chamber due to the pressure in the sealed chamber.

17. The method according to claim 16, further comprising the step of:
   maintaining in the sealed chamber a pressure capable of pushing, via discharging means, any fluids in the sealed chamber or fed into the sealed chamber out of the sealed chamber.

18. The method according to claim 16, wherein the step of pressurizing the sealed chamber occurs via a system holding another medium so that the other medium will be transported to an object in the sealed chamber.

19. The method according to claim 16, further comprising the step of:
   maintaining, in the sealed chamber, a pressure capable of pushing, via discharging means, any fluids in the sealed chamber out of the sealed chamber.

20. The method according to claim 16, further comprising the step of:
   maintaining, in the sealed chamber, a pressure capable of pushing, via discharging means, any fluids fed into the sealed chamber out of the sealed chamber.

21. The method according to claim 16, further comprising the step of:
   maintaining, in the sealed chamber, a pressure capable of pushing, via discharging means, any fluids from bearings located in the sealed chamber out of the sealed chamber.

22. The method according to claim 16, wherein the pressure in the sealed chamber is directed to a system holding another medium wherein the other medium is transported to an object in the sealed chamber.

23. A method according to claim 16, wherein the ship's propulsion arrangement is usable for steering.

24. A method for improving cooling in a ship's propulsion arrangement at least partly surrounded by water, wherein the arrangement comprises an electric motor located in a sealed chamber formed by walls of the arrangement, a propeller shaft associated with the electric motor having a propeller fitted outside the sealed chamber, wherein a gaseous medium is conducted into the sealed chamber, the method comprising the steps of:
   increasing the thermal conductivity of the gaseous medium by pressurizing the sealed chamber; and
   passing heat generated by the electric motor through the sealed chamber walls directly into the surrounding water via the pressurized gaseous medium in the absence of other heat exchange components.

25. A method according to claim 24, wherein the ship's propulsion arrangement is usable for steering.

26. A ship's propulsion arrangement, at least partially surrounded by water, comprising:
   an electric motor arranged in a sealed chamber formed by walls of the arrangement;
   a propeller shaft connected to the electric motor having a propeller fitted outside the sealed chamber;
   means for pressurizing the sealed chamber with a pressurizing medium;
   means for circulating the pressurizing medium via at least a portion of the sealed chamber and back to the outside of the sealed chamber;
   means for detecting any extraneous substances mixed with the pressurizing medium in a return circulation of the pressurizing medium.

27. The arrangement according claim 26, wherein the pressure in the sealed chamber is greater than the dynamic pressure prevailing between the bottom of the sealed chamber and a level substantially even with a discharge pipe located in an interior or the ship.

28. The arrangement according to claim 26, the arrangement further comprising:
   means for separating the extraneous substances from the pressurizing medium.

29. The arrangement according to claim 26, the arrangement further comprising:
   means for giving an alarm due to such substances.

30. The arrangement according to claim 26, the arrangement further comprising:
   means for separating the extraneous substances from the pressurizing medium; and
   means for giving an alarm when any extraneous substances are detected in the return circulation of the pressurizing medium.

31. The arrangement according to claim 26, wherein the pressurizing means includes a pressure source controlled by a pressure control unit for providing a pressure in the medium, means for conducting the medium into the sealed chamber, and means for closing the sealed chamber pressure-tightly against other compartments of the ship.

32. The arrangement according to claim 26, the arrangement further comprising means operating with the pressurizing means for feeding other substances in a controlled manner into the sealed chamber and correspondingly for removing the other substances from the sealed chamber.

33. The arrangement according to claim 26, the arrangement further comprising an operational seal provided between the sealed chamber and the surrounding water, wherein the pressurized medium is fed to the operational seal, and wherein the pressurizing medium contributes to the sealing of the operational seal.

34. A ship's propulsion arrangement, at least partly surrounded by water, comprising:
   an electric motor arranged in a sealed chamber formed by walls of the arrangement;
   a propeller shaft connected to the electric motor, the propeller shaft having a propeller fitted outside the sealed chamber;
   at least one pressurizing component for pressurizing the sealed chamber with a pressurizing medium, wherein a pressure maintained in the sealed chamber by the at least one pressurizing component is at least substantially the same as the hydrostatic pressure of the water surrounding the sealed chamber at a level even with the propeller shaft;
   at least one circulating feature for circulating the pressurizing medium between at least a portion of the sealed chamber and an area exterior to the sealed chamber; and
   at least one monitoring device for monitoring the composition of the pressurized medium.

35. An arrangement according to claim 34, wherein the at least one monitoring device monitors the pressure maintained in the sealed chamber.

* * * * *